Dec. 13, 1960  J. W. LOVETT, JR  2,963,858
THRUST REVERSER FOR JET ENGINES
Filed Aug. 10, 1956  2 Sheets-Sheet 1
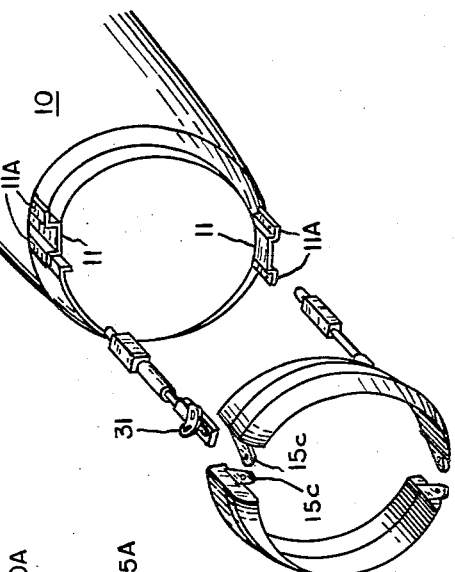
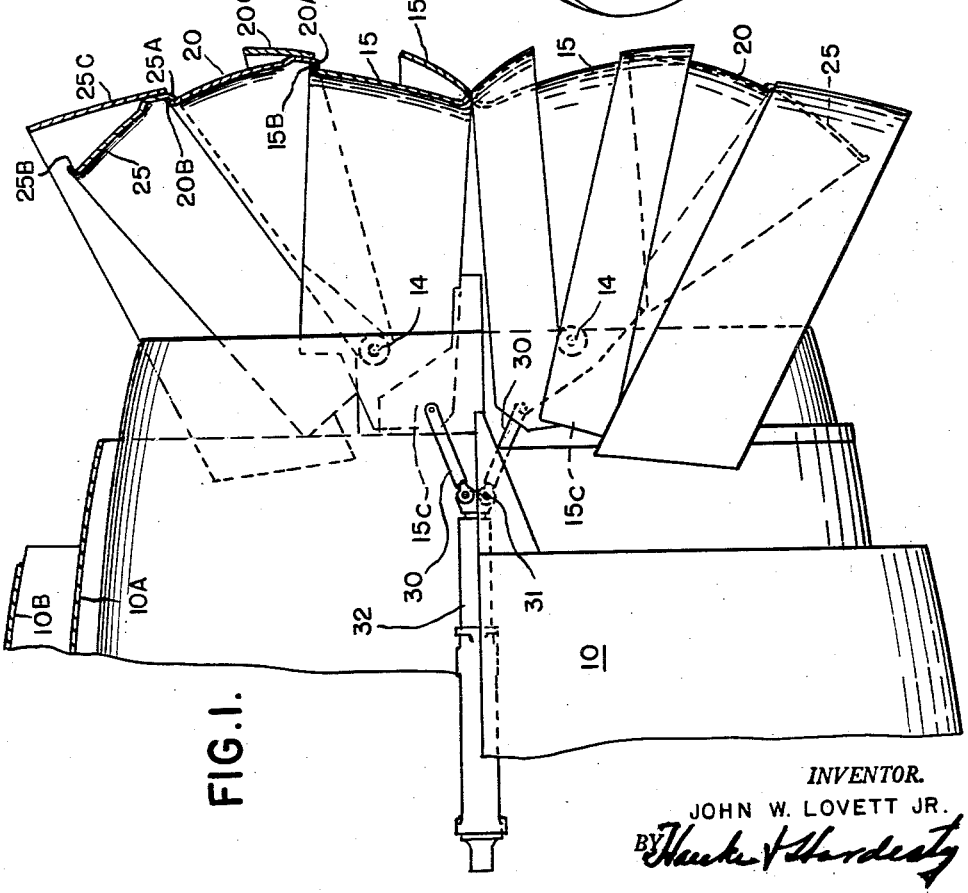
*INVENTOR.*
JOHN W. LOVETT JR.
ATTORNEYS Dec. 13, 1960   J. W. LOVETT, JR   2,963,858
THRUST REVERSER FOR JET ENGINES
Filed Aug. 10, 1956   2 Sheets-Sheet 2

INVENTOR.
JOHN W. LOVETT JR.
BY
ATTORNEYS

United States Patent Office 2,963,858
Patented Dec. 13, 1960

2,963,858

THRUST REVERSER FOR JET ENGINES

John W. Lovett, Jr., Livonia, Mich., assignor to Smith-Morris Corporation, Ferndale, Mich., a corporation of Michigan Filed Aug. 10, 1956, Ser. No. 603,252

2 Claims. (Cl. 60—35.55)

The present invention relates to thrust reversers for jet engines and to reversers of the mechanical blockage or target type.

Thrust reversers of the target type consist broadly of means carried by the nozzle or nacelle end of the engine to be interposed in the gas stream coming from the engine in such fashion as to receive and turn back the flow as nearly as possible to direction reverse to normal. By so reversing the gas flow, the direction of thrust is also reversed and acts as a brake means for the vehicle upon which the engine is mounted.

The present invention has among its objects to provide a target type thrust reverser which in its operating condition is efficient in its reversing action but which in its inoperative position offers a substantially no interference with normal gas flow.

Another object is a thrust reverser which is simple in construction and operation and relatively inexpensive to produce.

Still other objects will readily occur to those skilled in the art upon reference to the following description and the accompanying drawings in which Fig. 1 is a view of the rear end of a jet engine nacelle and of the thrust reverser partly in plan view and partly in horizontal section.

Fig. 4 is an exploded view of the reverser.

Figure 3:
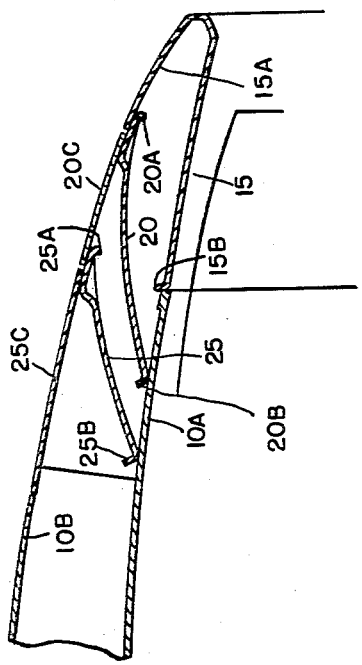
Fig. 3 is a section through the upper part of Fig. 2 and the reverser showing the nesting of the reverser parts.
Figure 2:
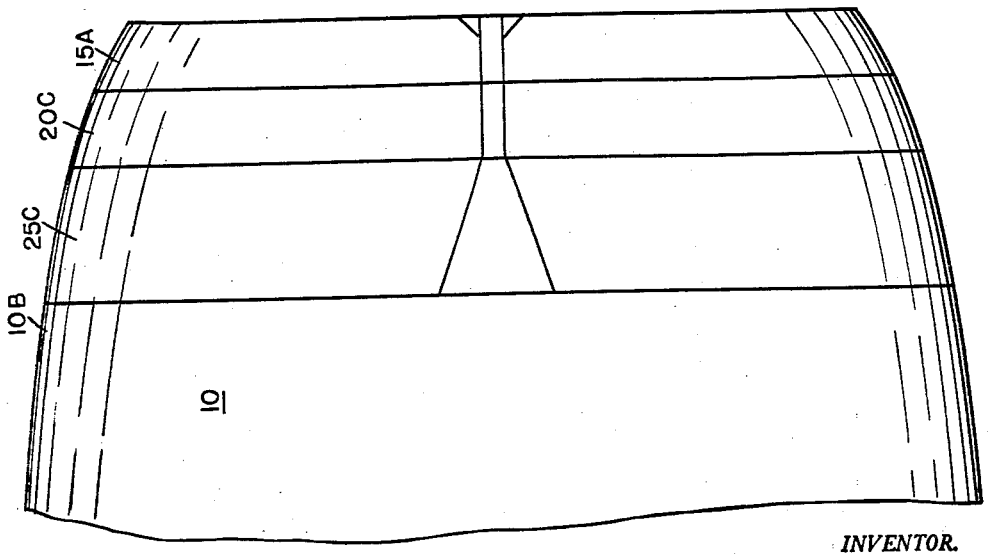
Fig. 2 is a top plan view of the nacelle and the adjustable nacelle section in closed or inoperative position.

In the drawings, the nacelle end of a conventional jet engine is indicated at 10, this being provided as usual with an inner wall 10A and a spaced outer wall 10b. The engine nozzle is enclosed generally by the nacelle as shown in Fig. 1. Between the two, that is, between the engine nozzle and the inner wall 10A of the nacelle and preferably at the top and bottom, is a channel member 11 having wide outwardly extending flanges 11A on its edges. As shown more clearly in Fig. 3, the inner wall 10A of the engine nacelle extends beyond the outer wall 10B and the channel member 11 extends somewhat beyond the edge of the inner wall.

The target or reverser consists of two separfate assemblies which are preferably identical but are mounted as "right" and "left." Each of the assemblies consists as shown of three nacelle sections or members 15, 20 and 25, all hinged on a common pivot pin, the outer end of one of the flanges 11A of the channel member 11. These nacelle sections 15, 20 and 25 are all of an overall substantially semicircular shape and of a radius the same as that of the engine nacelle. The common pivots of each of the assemblies is indicated at 14.

Of the three pivoted members, the rear nacelle section 15 is the innermost when the reverser is in operative position as shown in Fig. 1, and consists of a half annulus of a suitable metallic material having one edge 15A bent back upon itself and outwardly and having at its other edge a short outwardly extending annular flange 15B.

The second or intermediate nacelle section or member 20 also consists of a half annulus of the same material having at the edge adjacent member 15, a short inwardly extending flange or abutment 20A and at its other edge a short outwardly extending flange 20B. This member 20 also has fixed to its outer face, adjacent the flange 20A, an abliquely extending filler strip 20C comprising an outer wall of the nacelle section.

The third member 25 is likewise a half annulus of the same material and has along the edge adjacent member 20 a short inwardly extending flange or abutment 25A and on its edge a short outwardly extending flange 25B. Member 25 also has fixed to its outer face adjacent the flange 25A an obliquely extending filler strip 25C comprising the outer wall of the nacelle section.

As shown in Fig. 3, the out-turned edge portion 15A of member 15 and the filler strips 20C and 25C are so porportioned and formed that when the reverser is in inactive position, these several parts fit together edge to edge and with the edge of the outer skin surface 10B form a continuous smooth outer surface of the nacelle, while the edge of member 15 abuts the extended edge of the inner nozzle surface member 10A to provide a smooth continuous inner wall surface of the nacelle.

The member 15 is also provided with arms 15C extending beyond the pivots 14 and to these are pivotally attached links 30 which at their other ends are pivotally attached to a yoke 31 fixed to the end of an operating rod 32 lying within the channel 11. Longitudinal movement of the rod 32 will be accomplished in any suitable manner by the operator and will open or close the reverser; that is, will move the several members 15, 20 and 25 from the nester position of Fig. 3 to the open or operative position of Fig. 1.

The two half annular assemblies will move simultaneously and in open opsition the outer portions of members 15 will, as shown in Fig. 1, contact to produce a pair of partly spherical surfaces provided with a dividing edge portion so that the gases from the nozzle will be divided and deflected in the two directions.

I claim:

1. A thrust reverser for jet engines having inner and outer nacelle walls comprising at least three detached coaxial semi-annular nacelle sections enclosing the jet engine nozzle and comprising front, intermediate and rear outer wall portions of the nacelle abutting edge to edge when disposed in an inoperative position, means pivotally supporting said nacelle sections to permit them to swing into an operative position traversing the jet stream of said engine, said rear nacelle section having a semi-annular inner wall portion abutting the rear edge of the engine inner nacelle wall in inoperative position and thereby providing a continuous uninterrupted inner nacelle wall surface, said intermediate and front semi-annular nacelle sections each having a longitudinally extending outer wall portion abutted edge to edge in inoperative position to provide a continuous outer wall radially outwardly spaced from the nacelle inner wall in inoperative position, the rear rim of the outer wall of said intermediate and front nacelle sections having inwardly projecting semi-annular abutments, said front edge of the inner wall of said rear nacelle section having an outwardly extending flange disposed inwardly and forwardly of said next intermediate section abutment so as to engage it when said nacelle sections are moved into operative position, said intermediate nacelle section provided with a semi-annular wall portion inwardly angularly disposed with respect to the outer wall portion and terminating in an outwardly extending semi-annular flange at its front edge which engages the aforesaid semi-annular abutment of the next forward adjacent nacelle section and means extending generally between the engine nozzle and inner nacelle walls for actuating said nacelle sections to move same into operative and inoperative positions.

2. A thrust reverser for jet engines comprising at least three detached coaxial semi-annular nacelle sections enclosing the jet engine nozzle and comprising front, intermediate and rear outer wall portions of the nacelle abutting edge to edge when disposed in an inoperative position, means pivotally supporting said nacelle sections to permit them to swing into an operative position traversing the jet stream of said engine, said rear nacelle section having a semi-annular inner wall portion abutting the rear edge of the engine inner nacelle wall in inoperative position and thereby providing a continuous uninterrupted inner nacelle wall surface, said intermediate and front semi-annular nacelle sections each having a longitudinally extending outer wall portion abutted edge to edge in inoperative position to provide a continuous outer wall radially outwardly spaced from the nacelle inner wall in inoperative position, the rear rim of the outer wall of said intermediate and front nacelle sections having inwardly projecting semi-annular abutments, said front edge of the inner wall of said rear nacelle section having an outwardly extending flange disposed inwardly and forwardly of said next intermediate section abutment so as to engage it when said nacelle sections are moved into operative position, said intermediate nacelle section provided with a semi-annular wall portion inwardly angularly disposed with respect to the outer wall portion and terminating in an outwardly extending semi-annular flange at its front edge which engages the aforesaid semi-annular abutment of next forward adjacent nacelle section, and means disposed generally between the engine nozzle and inner nacelle walls for actuating said nacelle sections to move same into operative and inoperative positions, said nacelle sections comprising a semi-annular wall disposed symmetrically about a longitudinal plane through the jet stream axis and constructed to substantially abut in said plane when moved to an operative position, said rear nacelle section comprising a semi-annular wall structure spaced a greater distance from the pivotal support than said intermediate and front nacelle sections, the line of intersection of a plane through the jet stream axis extending normal to said first plane and said wall structure of said nacelle sections defining a substantially generally vertical line normal to the jet stream axis whereby to provide a baffle traversing the jet stream and having openings above and below the said first axial plane.

References Cited in the file of this patent

UNITED STATES PATENTS

| | | |
|---|---|---|
| 2,620,622 | Lundberg | Dec. 9, 1952 |
| 2,683,961 | Britton et al. | July 20, 1954 |
| 2,715,312 | Brame | Aug. 16, 1955 |
| 2,735,264 | Jewett | Feb. 21, 1956 |
| 2,806,349 | Yeager | Sept. 17, 1957 |
| 2,839,891 | Drakeley | June 24, 1958 |